United States Patent [19]

Furuhashi

[11] Patent Number: 4,853,835

[45] Date of Patent: Aug. 1, 1989

[54] PROTECTIVE APPARATUS FOR INVERTER

[75] Inventor: Takeshi Furuhashi, Inagi, Japan

[73] Assignee: Kabushiki Kaisha Toshiba, Kawasaki, Japan

[21] Appl. No.: 92,518

[22] Filed: Sep. 3, 1987

[30] Foreign Application Priority Data

Sep. 5, 1986 [JP] Japan ................................ 61-207667

[51] Int. Cl.[4] ........................................... H02H 7/122
[52] U.S. Cl. ........................................ 363/58; 363/136
[58] Field of Search ........................ 363/50, 56, 57, 58, 363/136

[56] References Cited

U.S. PATENT DOCUMENTS

| | | | |
|---|---|---|---|
| 3,683,264 | 8/1972 | Schieman et al. | 363/58 |
| 4,231,083 | 10/1980 | Matsuda et al. | 363/57 |
| 4,532,583 | 7/1985 | Nemoto | 363/58 X |
| 4,675,799 | 6/1987 | Suzuki et al. | 363/58 |

Primary Examiner—Patrick R. Salce
Assistant Examiner—Kristine Peckman
Attorney, Agent, or Firm—Foley & Lardner, Schwartz, Jeffery, Schwaab, Mack, Blumenthal & Evans

[57] ABSTRACT

In an inverter supplied with power from a DC power supply whose voltage rises at a light load operation, if an overcurrent failure occurs at a light load operation at the inverter output side as seen from the DC power supply, a surge voltage higher than a voltage withstanding of the switching elements of the inverter is generated across the elements, the surge voltage being higher by the amount corresponding to a rise in the DC power supply voltage. Therefore, there arises a possibility of breaking the switching elements. This inconvenience can be solved by lowering the overcurrent detection level by the amount corresponding to a rise in the DC voltage, when a light load operation as seen from the DC power supply side is performed.

7 Claims, 3 Drawing Sheets

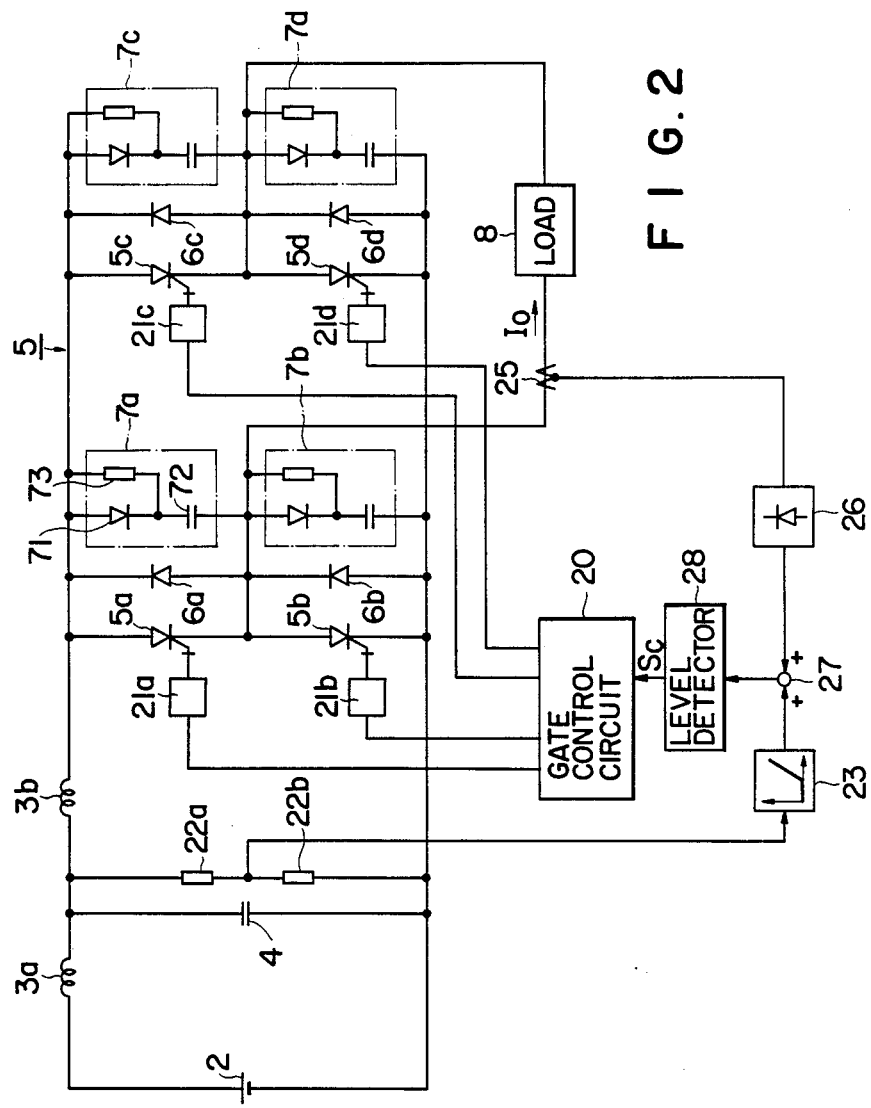
F I G. 2

PROTECTIVE APPARATUS FOR INVERTER

BACKGROUND OF THE INVENTION

1. Field of the Invention

The present invention relates to a protective apparatus for an inverter which protects switching elements constituting the inverter against an overvoltage generated at a turn-off operation.

2. Prior Art

There is known a voltage type inverter composed of self-extinguishing type switching elements such as gate turn-off thyristors (GTOs). A snubber circuit is provided to each switching element constituting an inverter of this type in order to absorb a voltage surge generated by circuit inductance during a turn-off operation. The snubber circuit is composed mainly of a serial circuit of a capacitor and a forward-biased diode, connected in parallel with a switching element to be protected, with a discharge resistor connected in parallel with the diode for the discharge of the capacitor.

If a short-circuit between lines or a short-circuit to ground occurs at the load side of the inverter while the inverter constructed as above is operated by supplying power from a DC power supply connected in parallel with a high frequency absorbing capacitor, an overcurrent protective apparatus immediately starts operating to cause the inverter to turn off when the inverter output current Io reaches an overcurrent detection level Ioc, e.g., 130% of the rated output current. Since the interruption of an overcurrent is effected by a turn-off operation of switching elements, surge voltages are generated across the switching elements. A peak value Vp of the surge voltage is given by the following equation, assuming that DC power supply voltage is Vd, circuit stray inductance is Ls and capacitance of a snubber capacitor is Cs:

$$Vp = Vd + Ioc \sqrt{Ls/Cs} \quad (1)$$

The capacitance Cs of the snubber capacitor is so selected that the voltage peak value Vp obtained by the equation (1) does not exceed a voltage withstanding specific to each switching element.

In the case that a DC power supply has the characteristics that its voltage rises as a load is reduced, such as shown by the characteristic curve of FIG. 3 of current Id relative to voltage Vd of a fuel battery, turning off the switching elements which is carried out in order to interrupt the overcurrent generated at the inverter output side during a light load operation as seen from the DC power supply causes the generation of surge voltages across the switching elements. The peak voltage Vp of the surge voltage in such a case becomes higher than that at a heavy load operation by the amount of the increased fraction of the voltage Vd. The problem associated with voltage withstanding can be solved if switching elements having a voltage withstanding higher than such a surge voltage are used. However, this results in an increase in cost of the apparatus.

It can be considered that the capacitance Cs of a snubber circuit capacitor be made large. However, the charge energy increases so that an increase in loss at the snubber resistor becomes large during the discharge, to hence lower the efficiency of the inverter apparatus.

Alternatively, the level of overcurrent detection may be lowered to suppress the surge voltage. However, the number of interruptions of the operation of the inverter may increase undesirably even under a load within a normal range.

SUMMARY OF THE INVENTION

It is, therefore, an object of the present invention to provide a protective apparatus for an inverter connected to a DC voltage supply whose voltage rises at a light load operation, capable of suppressing a voltage surge applied to switching elements when they are turned off upon detection of an overcurrent by an excessive load even during a light load operation, thus enabling the use of switching elements of low voltage withstanding and hence low cost.

It is another object of the present invention to provide a protective apparatus for an inverter connected to a DC voltage supply whose voltage rises at a light load operation, enabling a coordination between overcurrent detections at low and heavy load operations.

To achieve the above objects of the present invention, the protective apparatus for an inverter is characterized in that the overcurrent detection level at a light load operation of the inverter is made lower than that at a heavy load operation.

It is assumed that when the DC power supply voltage Vd is at level Vh as shown in FIG. 3, the surge peak value at a turn-off operation of a switching element upon detection of an overcurrent is an allowable limit of Vx, taking a margin of a switching element voltage withstanding into consideration. The overcurrent detection level Ioc with Vd>Vh is set as:

$$Ioc \leq (Vx - Vd)/\sqrt{Ls/Cs} \quad (2)$$

With this setting, the surge voltage generated across a thyristor element can be suppressed smaller than the allowable limit Vx, as understood from the equation (1).

BRIEF DESCRIPTION OF THE DRAWINGS

In the accompanying drawings:

FIG. 2 is a block diagram showing another embodiment of the prove apparatus for an inverter according to the present invention.

DETAILED DESCRIPTION OF THE INVENTION

The present invention will be described more in detail with reference to an embodiment shown in FIG. 1.

Figure 1:
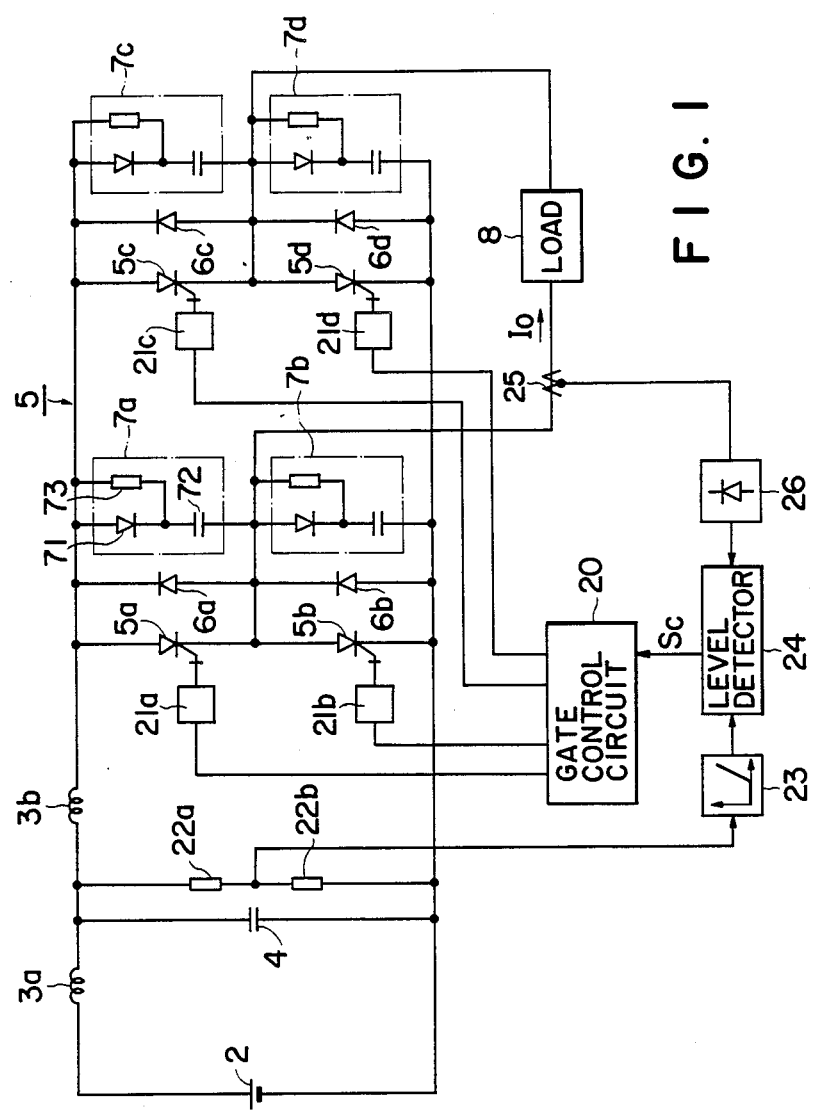
FIG. 1 is a block diagram showing a first embodiment of the protective apparatus for an inverter according to the present invention.

There are shown a power circuit and a protective circuit in FIG. 1. The power circuit is constructed of a DC power supply 2, a high frequency absorbing capacitor 4 connected in parallel with the DC power supply 2 via a circuit stray inductance 3a, a voltage type inverter 5 connected to the capacitor 4 via a circuit stray inductance 3b and a load 8 connected across the AC output terminals of the inverter 5. The inverter 5 is constructed of self-extinguishing type switching elements such as GTOs 5a, 5b, 5c and 5d, free-wheeling diodes 6a, 6b, 6c and 6d connected in parallel with each switching element, and snubber circuits 7a, 7b, 7c and 7d connected in parallel with each switching element. In this embodiment, the switching elements 5a, 5b, 5c and 5d constitute an inverter circuit of single phase bridge connection. Each snubber circuit is constructed of a serial circuit of a forward biased snubber diode 71 and a snubber capacitor 72, connected in parallel with each switching element, and a snubber resistor 73 connected in parallel with the snubber diode 71.

Each of switching elements 5a to 5d is controlled and driven by a gate control circuit 20 by way of each of gate drive circuits 21a, 21b, 21c and 21d.

Figure 3:
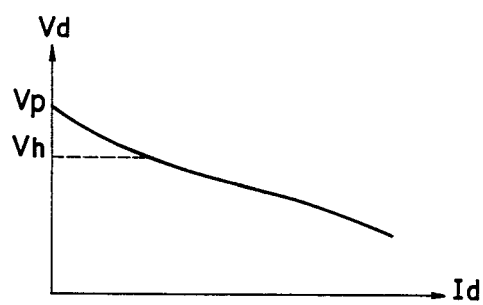
FIG. 3 is a graph showing the voltage versus current characteristics of a fuel battery.

Next, the protective circuit will be described. Voltage divider resistors 22a and 22b are connected across the capacitor 4 for detecting a voltage which is inputted as a detected voltage value of the DC voltage Vd to a function generator 23. The function generator 23 outputs a zero voltage when an input DC voltage Vd is equal to or smaller than the voltage Vh shown in FIG. 3, i.e., when $Vd \leq Vh$, and outputs a current signal $k \cdot (Vd-Vh)$ corresponding to a value of $Vd-Vh >$ when the input voltage Vd exceeds the voltage Vh, i.e., when $Vd > Vh$. load current Io supplied to the load 8 from the inverter 5 is detected by a current detector 25 and inputted via a wave shaping circuit 26 to the level detector 24 as a second input signal. The level detector 24 monitors the load current based on the input signal from the wave shaping circuit 26 and outputs an overcurrent detection signal Sc under the condition of $$Io \geq Ioc - k \cdot (Vd\text{-}Vh) \qquad (3)$$

assuming that a reference overcurrent detection level set for the load current region is Ioc within which region the detected value of the DC voltage Vd becomes equal to or smaller than Vh. The equation (3) indicates that the overcurrent detection signal Sc is immediately outputted when a load current Io reaches the reference overcurrent detection level Ioc under $Vd \leq Vh$, however, under $Vd > Vh$ the overcurrent detection signal Sc is outputted when a load current Io reaches a value smaller than the reference overcurrent detection level Ioc by the amount of $k \cdot (Vd-Vh)$. The overcurrent detection signal Sc is inputted to the gate control circuit 20 to turn off the switching elements 5a, 5b, 5c and 5d via the gate drive circuits 21a, 21b, 21c and 21d, respectively.

As seen from the foregoing description, in the inverter 5 supplied with power from the DC power supply whose voltage rises at a light load operation, if an overcurrent flows through the inverter 5 while the DC voltage Vd has risen larger than the voltage Vh, the voltage peak value Vp expressed by the equation (1) is suppressed lower than the allowable limit Vx by making the overcurrent detection level smaller than the reference overcurrent detection level Ioc by the amount of $k \cdot (Vd-Vh)$. Therefore, switching elements of lower voltage withstanding can be used. Since the output current of the inverter 5 is smaller than a rated current at the light load operation, frequent interruption of the operation will not occur even if the overcurrent detection level is lowered.

FIG. 2 is a block diagram showing a second embodiment of the protective apparatus for an inverter according to the present invention. The power circuit, current and voltage detection portions and the function generator 23 have similar construction to those shown in FIG. 1. In this embodiment, a load current Io obtained as an output signal from the wave shaping circuit 26 and a signal $k \cdot (Vd-Vh)$ obtained as an output from the function generator 23 are added together by an adder 27. The sum of $$Io + k \cdot (Vd - Vh) \qquad (4)$$

is inputted to the level detector 28. The level detector 28 outputs the overcurrent detection signal Sc when the value expressed by the equation (4) becomes equal to or larger than the reference overcurrent detection level Ioc, i.e., when $$Io + k \cdot (Vd - Vh) \geq Ioc \qquad (5)$$

or $$Io \geq Ioc - k \cdot (Vd - Vh) \qquad (6)$$

The equation (6) is the same as the equation (3). Thus, quite the same overcurrent detection results as that of the embodiment shown in FIG. 1 can be obtained in the embodiment shown in FIG. 2.

What is claimed is:

1. A protective apparatus for an inverter connected to a DC power supply whose voltage rises during light load operation, said inverter comprising self-extinguishing type switching elements connected with snubber circuits including snubber capacitors, respectively, said apparatus being used for protecting said switching elements from an overvoltage generated at a turn-off operation, said protective apparatus comprising:
   voltage detection means for detecting a voltage of said DC power supply;
   load current detection means for detecting a load current outputted from said inverter;
   level setting means for setting a reference overcurrent detection level;
   overcurrent detection means for outputting an overcurrent detection signal when the load current detected by said load current detection means reaches said reference overcurrent detection level set by said level setting means while the DC voltage detected by said voltage detection means is less than a predetermined value, and when the load current detected by said load current detection means reaches a level lower than said reference overcurrent detection level set by said level setting means while the DC voltage detected by said voltage setting means is larger than said predetermined value; and
   means responsive to said overcurrent detection signal from said overcurrent detection means for turning off said inverter.

2. A protective apparatus for an inverter according to claim 1, wherein said overcurrent detection means includes a function generator for outputting a "0" signal when the DC voltage detected by said voltage detection means is less than said predetermined value, and when said DC value is larger than said predetermined value, outputting a signal corresponding to a difference between the detected DC value and said predetermined value.

3. A protective apparatus for an inverter according to claim 2, wherein said overcurrent detection means includes means for outputting an overcurrent detection signal when the load current detected by said current detection means reaches a value of said reference overcurrent detection level set by said level setting means subtracted by an output from said function generator.

4. A protective apparatus for an inverter according to claim 2, wherein said overcurrent detection means inlcudes means for adding together the load current detected by said current detection means and an output rom said function generator, and means for outputting he overcurrent detection signal when an output from said addition means reaches said reference overcurrent detection level.

5. A protective apparatus for an inverter connected to a DC power supply whose voltage rises during light load operation, said inverter comprising self-extinguishing type switching elements connected with snubber circuits including snubber capacitors, respectively, said apparatus being used for protecting said switching elements from an overvoltage generated at a turn-off operation, said apparatus comprising:
  voltage detection means for detecting a voltage of said DC power supply;
  load current detection means for detecting a load current outputted from said inverter;
  level setting means for setting a reference overcurrent detection level;
  overcurrent detection means for outputting an overcurrent detection signal when the load current detected by said load current detection means reaches said reference overcurrent detection level set by said level setting means while the DC voltage detected by said voltage detection means is less than a predetermined value, and when the load current detected by said load current detection means reaches a level lower than said reference overcurrent detection level set by said level setting means while the DC voltage detected by said voltage setting means is larger than said predetermined value; and
  means responsive to said overcurrent detection signal from said overcurrent detection means for turning off said inverter, wherein
  said overcurrent detection means includes a function generator for outputting a "0" signal when the DC voltage detected by said voltage detection means is less than said predetermined value, and when said DC value is larger than said predetermined value, outputting a signal corresponding to a difference between the detected DC value and said predetermined value.

6. A protective apparatus for an inverter according to claim 5, wherein said overcurrent detection means includes means for outputting an overcurrent detection signal when the load current detected by said current detection means reaches a value of said reference overcurrent detection level set by said level setting means subtracted by an output from said function generator.

7. A protective apparatus for an inverter according to claim 5, wherein said overcurrent detection means includes means for adding together the load current detected by said current detection means and an outputting the overcurrent detection signal when an output from said addition means reaches said reference overcurrent detection level.

* * * * *